May 22, 1928.
G. A. HORMEL
MEAT WASHING MACHINE
Filed Oct. 16, 1926
1,670,809
5 Sheets-Sheet 1
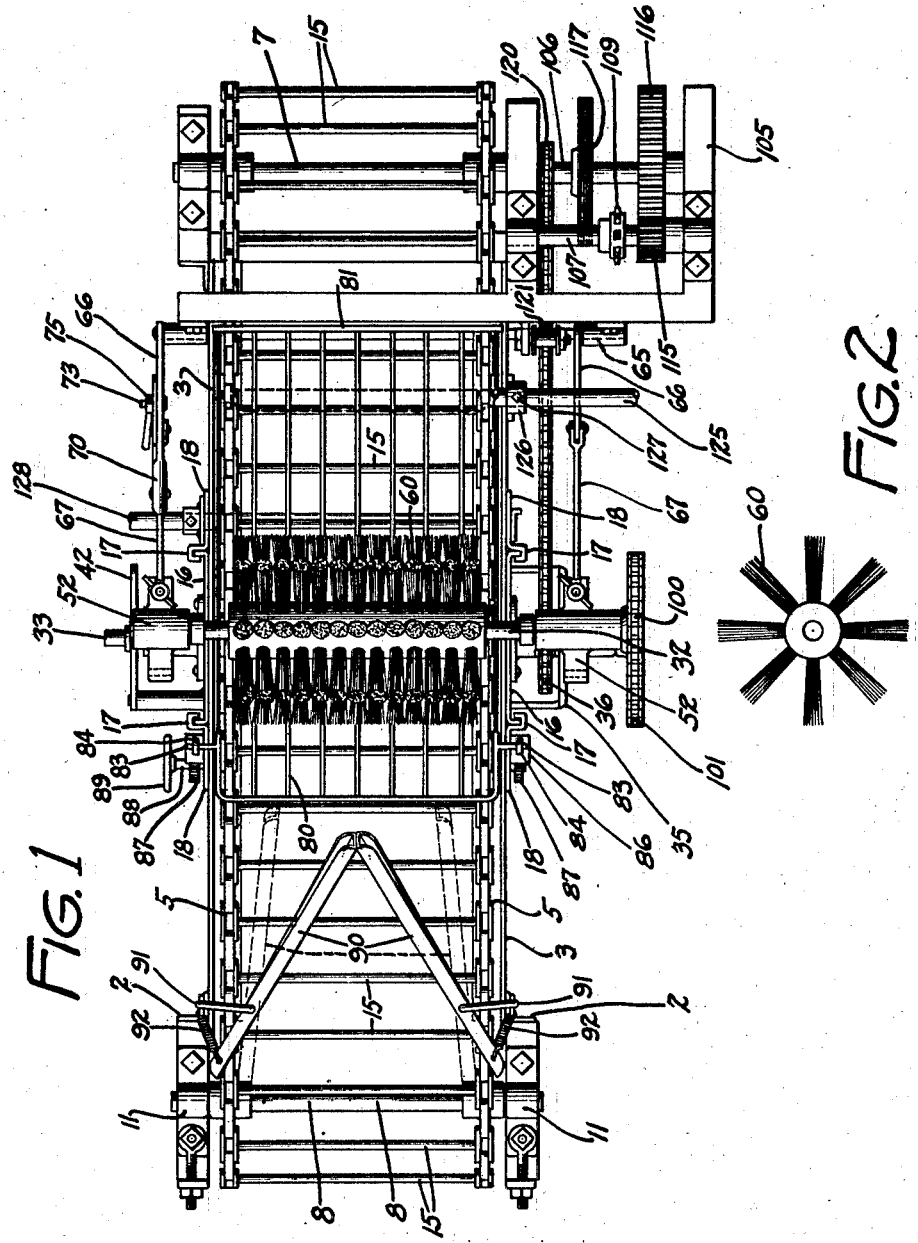
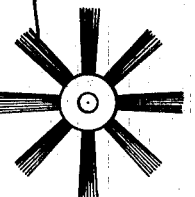
Inventor
GEORGE A. HORMEL
By Paul, Paul & Moore,
ATTORNEYS

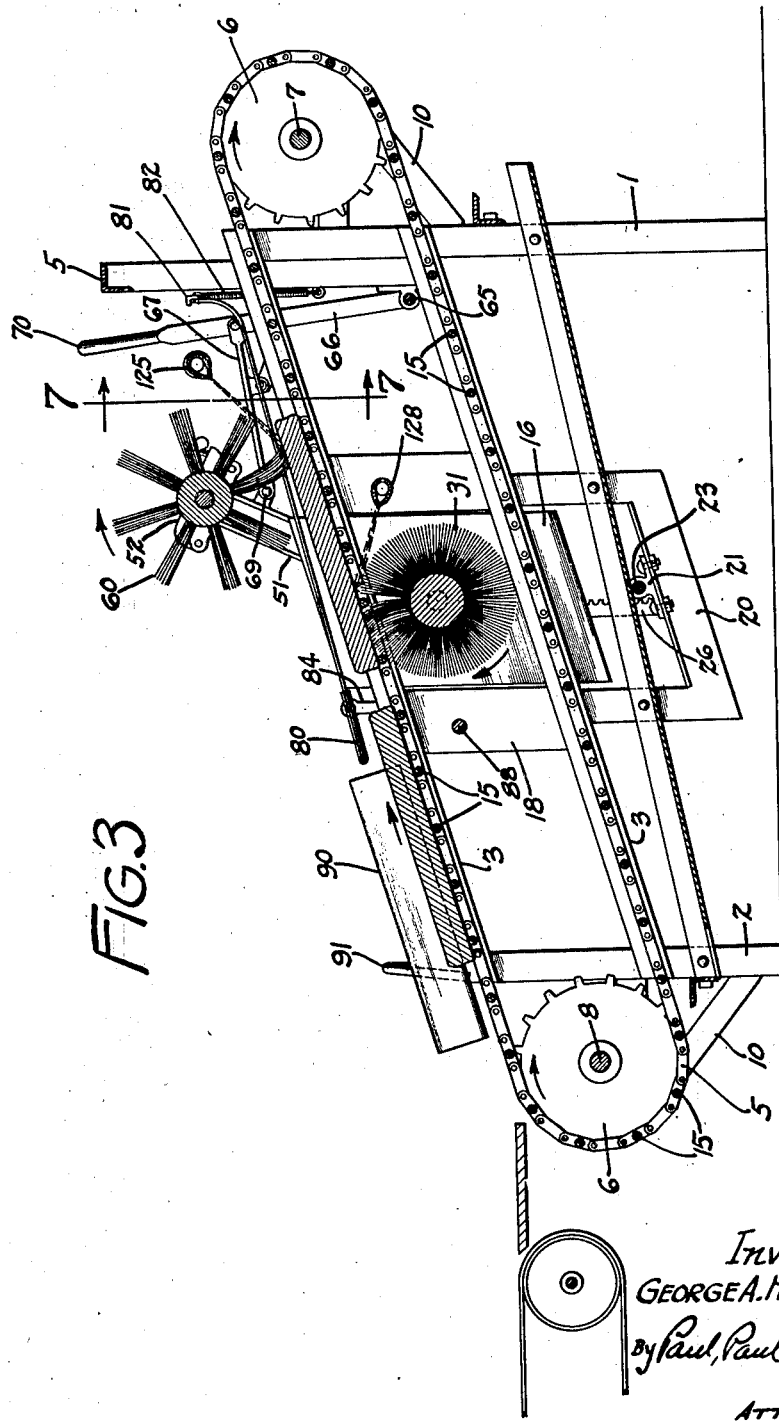

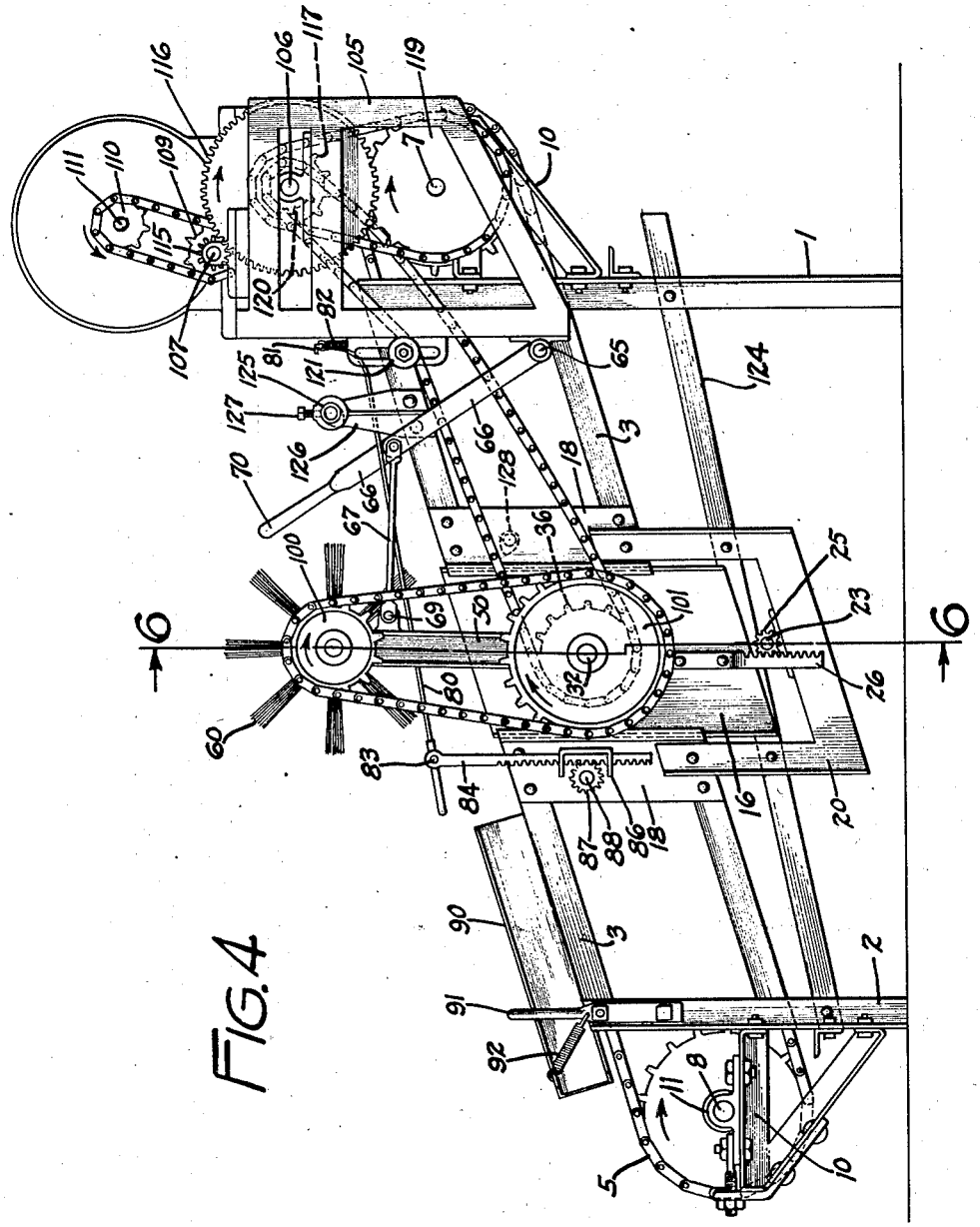

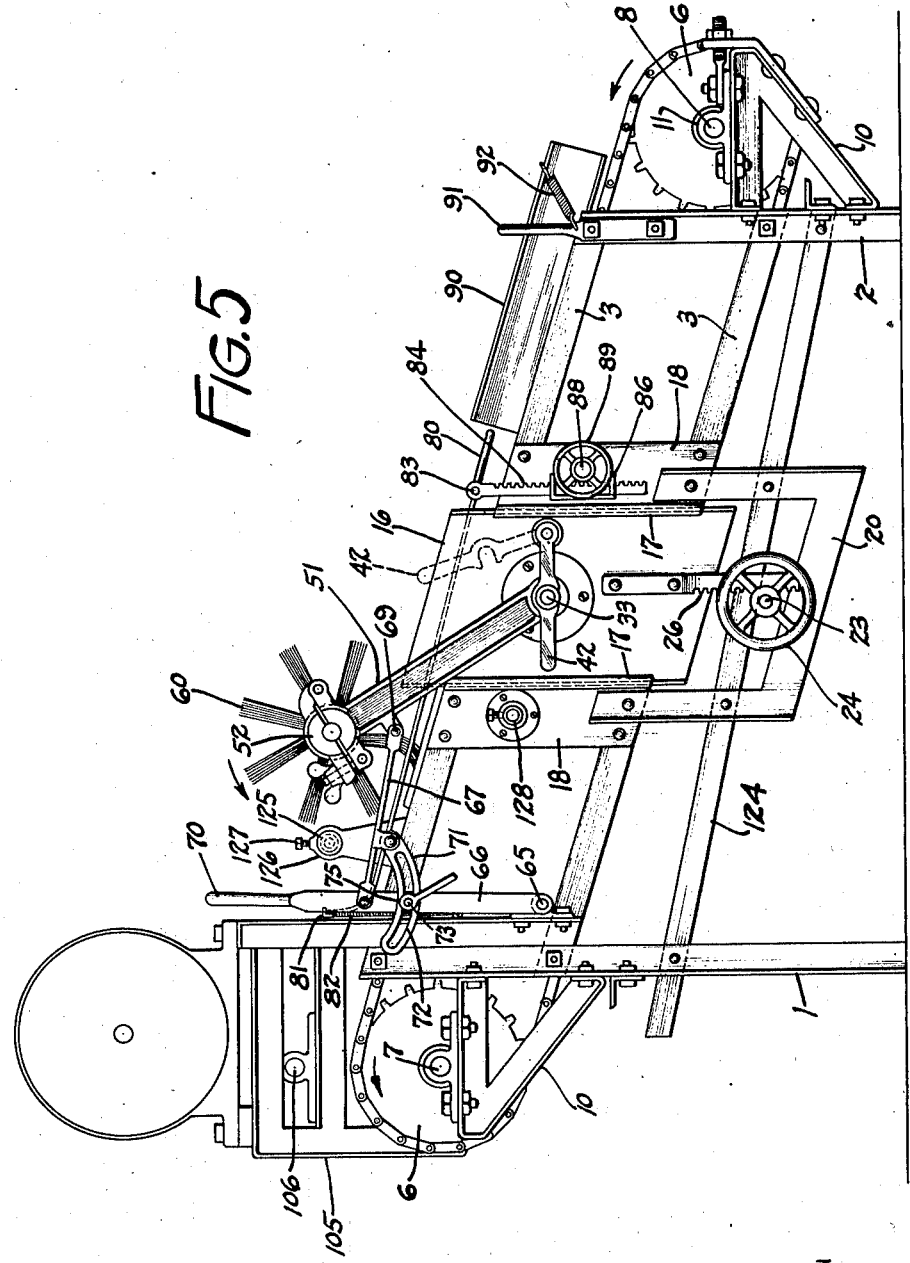

May 22, 1928.

G. A. HORMEL 1,670,809

MEAT WASHING MACHINE

Filed Oct. 16, 1926

Inventor
GEORGE A. HORMEL
By Paul, Paul & Moore
ATTORNEYS

Patented May 22, 1928.

1,670,809

UNITED STATES PATENT OFFICE.

GEORGE A. HORMEL, OF AUSTIN, MINNESOTA.

MEAT-WASHING MACHINE.

Application filed October 16, 1926. Serial No. 142,068.

This invention relates to a device for washing meats, to remove grease, loose fat, and salt, automatically and continuously, from sweet pickle and dry salt meats, to prepare the same for smoking.

Objects of the invention are to provide brushes arranged above and below a conveyor for engaging the meat from both sides as it is fed forwardly; to provide means for holding the meat against the brushes, and against curling; to provide means for operating the brushes respectively in certain predetermined directions relative to belt travel; to use one of the brushes to assist in feeding the meat, while at the same time perform the cleaning operation; and to provide means for synchronizing belt and brush travel to make the peripheral speed of one of the brushes different than the speed of the belt, at point of contact therewith.

Features of the invention include the arrangement of the brushes and the direction of rotation of the brushes, both in relation to direction of feed of the upper run of the belt; the construction of the brushes for the purpose in hand; the direction of sprays with the meeting angles of brush and meat; the use of means for holding the stock upon the belt while being brushed and fed; the rocking adjustment of the upper brush; the mounting of the rocking supports upon the axle of the lower brush; the common adjustable mounting for upper and lower brushes; the provision of common driving means and connections for driving the brushes and feed belt in predetermined manner relative to one another, and the general arrangement of the elements as well as their construction per se.

Other objects, features and certain advantages will be set forth in the description of the drawings forming a part of this application and in said drawings, Figure 1 is a top plan view, with the top brush raised;

Figure 2 is an end view of one of the specially constructed brushes;

Figure 3 is a vertical longitudinal section;

Figure 4 is a side elevation from the driving side of the machine;

Figure 5 is a side elevation of the side opposite that shown in Figure 4;

Figure 6:
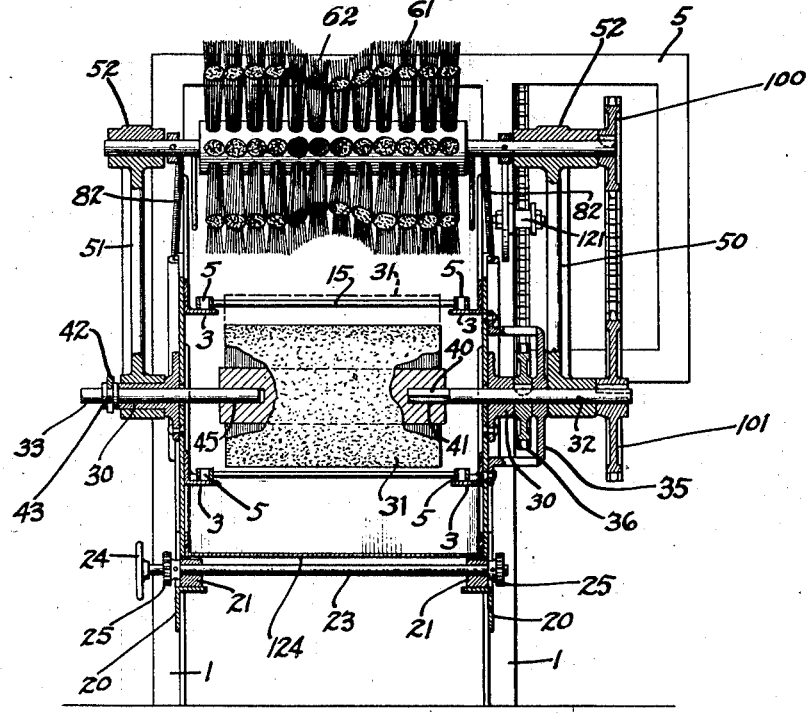
Figure 6 is a vertical transverse section on the line 6—6 of Figure 4.
Figure 7:
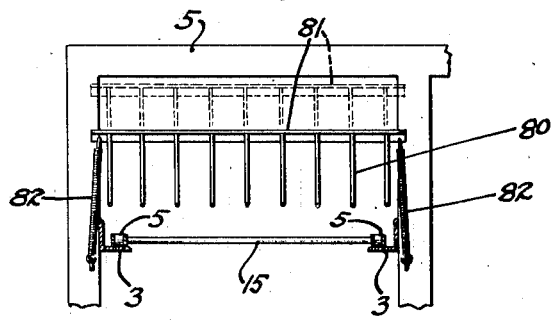
Figure 7 is a detail, transverse section substantially on the line 7—7 of Figure 3, showing how the grid is yieldably attached at its upper end.

The main frame of the machine is constructed of galvanized angle iron, and supports a conveying apron in inclined position.

The frame includes upright rectangular, transversely disposed end frame sections, 1, 2. The frames are connected longitudinally by pairs of angle irons 3. The upper irons preferably have their concave faces opposingly related to provide inwardly directed horizontal flanges acting to support the sprocket chains of an endless carrier or belt at points within the machine frame.

This carrier belt is composed of a pair of chains 5, each of which engages two sprocket wheels 6. The sprocket wheels are secured in pairs to upper and lower shafts 7, 8, the wheels being keyed to the shafts and the shafts being supported by brackets 10 as best shown in Figures 4 and 5. The journal boxes 11 for the lower shaft are adapted to be adjusted in direction longitudinally to the carrier. The chains are cross connected at intervals by bars 15 extending transversely of the main frame and secured in parallel relation. The connection between the bars and the chains may be made in any preferred manner to form a grid-like carrier or belt.

Slidably mounted one on each opposite side and intermediate the diagonal frame members 3, at the outer side, are plates 16 arranged for vertical adjustment. These plates may be slidably mounted in any suitable manner, but are herein shown as having opposite vertically disposed edges turned outwardly, and engaged with guides 17 formed upon guide plates 18. The guides 17 are formed by rebending the plates 18 as shown in Figure 1, to form a groove. The plates 18 are suitably secured as by screws.

Attached to the outer face of each guide plate 18 and extending downwardly, one at each side of the frame, is an auxiliary frame 20 having a bearing 21 centrally thereof. The shaft 23 is arranged in the aligned bearings of these frames 20, and has an operating hand wheel 24. The shaft 23 moreover carries a pair of pinions 25 in mesh with the vertical racks 26, carried, one each, by the plates 16. This construction provides means for adjusting the plates 16 vertically.

The plates 16 are provided with journal boxes 30 aligned crosswise of the machine, see Figure 6. Between these journal boxes 30 and between the runs of the carrier, is arranged a brush 31 also referred to as the lower brush, which is removably supported by stub shafts 32, 33, said shafts being journaled in respective bearings 30 of the plates 16. The function of this brush is to clean the flesh side of the meat, assist in feeding the meat, and to clean and polish the crossbars of the conveyor belt. The brush has an outside diameter of about twelve inches, the fibers being long and closely set. The fiber is stiff so that it can work through the bars of the conveyor.

The lower brush is driven from the stub shaft 32, which is rotatably mounted in one of the bearings 30 of the plates and extends outwardly beyond the frame, the outer end of the bearing being supported by a spider-like bearing frame 35. The shaft has a driving sprocket wheel 36, lying between the hubs of the supporting plate and spider frame. The inner end of this shaft is squared as at 40 and fits in a correspondingly squared opening 41 of the hub of the brush as shown. The driving stub shaft is thus supported by inner and outer bearings having a driving sprocket therebetween. The other stub shaft 33 is adapted to be held in supporting position against longitudinal movement by means of a lever 42 having an edge engaging in a circular groove 43 of the shaft, adjacent its outer end. The inner end of the shaft sockets within the circular opening 45 of the brush hub, to rotatably support the hub at this end.

Swingingly arranged upon the stub shaft 32 at the outer side of the spider 35, is a brush-supporting arm 50. A similar arm 51 is arranged upon the bearing 30. Each arm is provided with an upper bearing 52, the upper portion of which is hinged to permit quick removal of the shaft, when change from one kind of brush to another is required, see Figures 1 and 5.

The upper brushes 60, 61 are adapted to be raised and lowered and swung according to the thickness of the meat, to properly engage the same. The upper brush 60 is for removing salt from dry salt meats and grease and loose fat from sweet pickle meats and this upper brush, as well as its alternate, is made to rotate, at point of engagement with the belt, in a direction opposite to the direction of travel of the belt, approximately at a speed of 240 R. P. M. This brush is adapted to clean the skin side of the meat. There are two brushes used alternately on this upper mounting, according to the kind of meat being cleaned. The flat meat brush 60, see Figures 1, 2, 3, 4, and 5, is approximately sixteen inches in outside diameter and the fiber is approximately six inches long and is composed of straight "Bassine." The fiber is placed in eight rows around the circumference of the core and the core is approximately four inches in diameter. The construction of these upper brushes is important inasmuch as they must bend in the manner of a paint brush as they engage the meat so that the meat is not torn but only brushed, and this brushing action is performed while water is thrown downwardly towards the angle between the brushes and the stock and while the meat is traveling against the action of the brush. The brush for hams and shoulders, designated 61, is about twenty inches outside diameter, the fiber being about eight inches long and being also of straight "Bassine." The fiber is arranged as in the first case in eight rows around the circumference, and the center of the brush is preferably reduced in diameter as at 62 to conform somewhat to the curvature of the hams or shoulders at their middles. The bristles of the brushes are arranged to project through the grid or bars of the upper run of the carrier, and have a paint-brush action, and also perform a kind of scraping action.

In order to hold the swinging brush frame in its adjusted position and in order to simultaneously adjust each arm of this frame to prevent twisting, I provide the following device, arranged transversely of and between the longitudinal connecting bars 3 at the delivery end of the carrier. A shaft 65 has at each of its opposite ends a lever or arm 66 projecting upwardly, in this instance to a point above the carrier. To each lever at a point above its pivotal point, is pivotally attached by one end, a link 67, the opposite end of which is pivotally attached as at 69 to a corresponding standard, at a point adjacent its upper end near the bearing. One of the levers has a handle 70 and it will be apparent that when one lever is operated, the other will be simultaneously moved. Pivoted to one of the links 67 in this instance the one which connects with a hand lever, is an arcuate element 71 having an arcuate slot 72 therein. This element is engaged flatly against the outer side of the hand lever, and a bolt 73, freely traverses the slot and lever, and has in threaded engagement therewith a hand-operable nut 75 adapted to clamp the arcuate element against the lever to hold the lever in an adjusted position. Thus means is provided for raising and lowering the upper brush to control the space conforming to the thickness of the meat, and means is also provided to hold the brush supports in adjusted position.

It will be further noted that the journals of all brushes are adjustably supported by the same members; that is, by the vertically adjustable plates, so that when one brush journal is adjusted the other will be correspondingly simultaneously adjusted.

In order to assist in holding the meat or stock, particularly flat meat, upon the carrier belt, and prevent curling of the same, when the upper brush engages, a grid 80 is provided composed of longitudinally arranged transversely spaced bars, the same being attached at the ends to transverse bars 81, or if desired to a substantially rectangular frame; the upper ends of the bars having upwardly curved portion at the forward or delivery end of the machine. This grid is adapted to be adjusted at its lower end, and is yieldably held at its upper or delivery end by a pair of springs 82 attached at the outer end of the grid frame and extending downwardly and attached to the main frame. Adjacent the lower end of the grid the same has attached thereto in transversely alined relation, a pair of projections 83, see Figure 1, to each of which is pivotally secured a rack 84, extending downwardly at the outside of the main frame. This rack is suitably guided as at 86, see Figure 4, and each rack has engaged thereto a pinion 87 carried by a transverse shaft 88, journaled at opposite ends in one of the slide plates and arranged beneath the upper run of the carrier transversely of the main frame. A suitable hand wheel 89 permits rotation of the shaft to raise and lower the grid.

Guide arms 90 are provided for centering the meat on the apron or carrier and they are intermediately pivoted each upon a bracket 91 attached by one end as by screws to the vertical corner post at the lower end of the frame. These elements are adapted to swing outwardly to permit the body to pass upwardly toward the brushes, and each arm is yieldably held by a spring 92 having one end attached to the bracket and the other end attached to the element at that side below its pivotal point.

Means are provided for simultaneously driving the belt and brushes, the upper brush 60 or 61 in a direction opposite to belt travel, and the lower brush 31 in the same direction and at a greater speed than belt travel. Ordinarily the upper brush will be the one that is driven in a direction opposite to belt travel, while the lower brush will be the one which is driven in the same direction as belt travel and at an increased speed. The upper brush shaft is provided with a sprocket 100 at the outer side, and the lower brush stub shaft 32 is also provided with a sprocket 101 which lies at the outside of the outer bearing of said stub shaft (see Figure 6). The upper sprocket is of less diameter than the lower sprocket see Figure 4. Mounted upon the frame 1 at the delivery end of the machine, and arranged above the conveyor is a frame 105 preferably composed of angle iron material made up in any suitable manner, and providing bearings for a countershaft 106 (see Figures 1 and 4), this shaft being arranged in a transverse direction and at the same side as the brush sprockets before mention, and above the shaft 7. Above this shaft is a second countershaft 107, arranged in parallel relation to the first shaft and above the same, and this shaft carries a sprocket gear 109 driven from a sprocket gear 110 carried by the shaft 111 of a motor, the motor being mounted upon the top of the frame as shown. The shaft 107 carries a pinion 115 which is in mesh with a gear 116 carried by the lower shaft 106. The lower shaft has a sprocket wheel 117 of small diameter keyed thereto and connected by a suitable sprocket chain with a driving sprocket 119 keyed to the conveyor shaft 7. In addition this lower shaft has a sprocket 120, see Figure 4, of comparatively small diameter connected by a suitable chain with the inside sprocket 36 of the lower brush 31, a suitable idler pulley 121 being provided for the upper run of this sprocket chain, the said idler being suitably adjustably journaled to the frame.

Thus the lower shaft 106 drives all the sprocket wheels, power being transmitted to this shaft through a countershaft operated by a motor or any other suitable power means. The relative diameters of the sprocket wheels are such that the belt and brushes are simultaneously driven, one brush in direction opposite the top surface of the other belt run, and the other brush in the same direction as the surface below said upper run, with this latter brush having a greater peripheral speed than the belt, at point of contact with the belt. A suitable drip pan 124 is arranged to catch the drippings, and scrapings.

Arranged transversely above the grid and preferably carried by the frame which supports the upper brush is a supply pipe 125 arranged transversely in a suitable bracket 126 carried by the main frame. The pipe is cross-sectionally configurated and arranged to deliver a water spray into the angle between the brush and grid, on the forward side of the brush. The pipe is preferably made rotatably adjustable so that the spray can be accurately directed and for this purpose a set screw 127 is provided, the pipe being adapted to turn in the bearing. Another pipe 128 is arranged transversely between the upper and lower runs of the carrier and is preferably made adjustable for the same purpose as the upper or first mentioned supply pipe. This spray is herein shown arranged to be directed upwardly and rearwardly into the angle between the lower brush and the lower side of the upper run of the carrier. The application of water described is found very efficient. The meat is moistened as it reaches the brushes, and a constant stream plays directly against both sides of the meat, and at point of contact between the brush and meat, and passes through the bristles, to wet a portion of the approaching surface, as well as that portion engaged by the brushes.

By the use of this machine a fifty per cent reduction in the cost of handling has been secured. The machine uses less water and is more sanitary, by far, than handling the meats by hand. The meat is more uniformly cleaned and all grease and fat are saved. Production is increased forty per cent over the old hand method of washing. The machine is self-cleaning due to the action of hot water sprays on the brush and moving apron.

The machine handles light pieces of thin bellies as well as very thick bellies, and also handles small bacon squares as well as heavy stiff dry salt bellies. Moreover, the machine will handle light hams and shoulders as well as the heaviest hams.

The brushes are constructed and are adjustable to touch the meat lightly and therefore the meat is not torn but only cleaned and the wear on the brush is negligible.

The hot water sprays are located so that the water strikes the meat in a straight line just in front of the brush. One of the hot water sprays is located so that the water strikes the brush and meat just in front of the brush and meat. The water is thus applied during brushing and after the meat is brushed. It acts to dissolve the salt and carry away all the loosened fat.

I claim as my invention:

1. A device of the class described comprising a conveyor belt having transverse grid bars, a brush between the belt runs having bristles projecting upwardly through the grid bars of the upper run, and means for driving the belt and brush in the same direction at point of engagement.

2. A device of the class described comprising a conveyor belt having transverse grid bars, a brush between the belt runs, having bristles projecting upwardly through the grid bars, and means for driving the belt and brush in the same direction at point of engagement, the brush at a greater speed than the belt.

3. A device of the class described comprising a conveyor belt, a brush between the belt runs having bristles projecting through the upper run of the belt, and means for driving the belt and brush in the same direction at point of engagement, the brush at greater speed than the belt, and means for directing a spray of water into the meeting angle of brush and belt.

4. A device of the class described comprising a conveyor belt, a brush above the belt having bristles projecting through the belt, a grid between belt and brush, and means for driving belt and brush in opposite directions at point of engagement.

5. A device of the class described comprising a conveyor belt, a brush above the belt having bristles projecting through the belt, and a grid between belt and brush, and means for driving belt and brush in opposite directions at point of engagement, and means for directing a spray into the meeting angle of brush and belt.

6. A device of the class described comprising a conveyor belt having transverse grid bars, a brush between the belt runs having its axle arranged transversely of the belt and having bristles projecting upwardly through the grid bars of the upper run, slide plates supporting the axle for rotation and having arms swingable thereabout, and a brush rotatably held by the arms above and transversely of the belt.

7. A device of the class described comprising a conveyor belt having transverse grid bars, a brush between the belt runs having its axle arranged transversely of the belt and having bristles projecting upwardly through the grid bars of the upper run, slide plates supporting the axle for rotation and having arms swingable thereabout, and a brush rotatably held by the arms above and transversely of the belt, and means interposed between said belt and upper brush to hold the stock against the belt.

8. A device of the class described comprising a conveyor belt, a brush between the belt runs having its axle arranged transversely of the belt and having bristles projecting upwardly through the belt, a vertically adjustable means supporting said axle for rotation, arms swingable upon the axle and having a brush rotatable thereon above and transversely of the belt, and a grid above the belt between the upper brush and belt engageable with the stock to hold the same against curling.

9. A device of the class described comprising a conveyor belt having transverse grid bars, a brush between the belt runs having its axle arranged transversely of the belt and having bristles projecting upwardly through the grid bars of the upper run, slide plates supporting the axle for rotation and having arms swingable thereabout, a brush rotatably held by the arms above and transversely of the belt, and means for simultaneously driving belt, and brushes, the upper brush in a direction opposite belt feed, and the lower in the same direction at a greater speed than the belt.

10. A device of the class described comprising a conveyor belt having transverse grid bars, a brush between the belt runs having its axle arranged transversely of the belt and having bristles projecting upwardly through the grid bars of the upper run, slide plates supporting the axle for rotation and having arms swingable thereabout, a brush rotatably held by the arms above and transversely of the belt, means interposed between said belt and upper brush to hold the stock against the belt, and means for driving the belt, and brushes, one brush in a direction opposite to that of one belt run and the other in the same direction as the other belt run.

11. A device of the class described comprising a base frame, an endless carrier upon the frame having transverse grid bars, a brush mounted to rotate between runs of the carrier substantially transversely thereof, and adapted to be adjusted to have its bristles projected between and above the bars of the carrier, and a stationary grid above the carrier composed of longitudinally arranged spaced bars, said grid being vertically adjustable at one end and having its opposite end held in spaced relation to the carrier, to yield upwardly.

12. A device of the class described comprising a base frame, an endless carrier upon the frame having transverse grid bars, a brush mounted to rotate between the runs of the carrier and having its bristles projecting through the carrier bars, a stationary grid above the carrier composed of longitudinally arranged spaced bars, a rotatable brush swingingly adjustable above the grid, the journals of said brushes having a common mounting vertically adjustable.

13. A device of the class described comprising a base frame and gridlike carrier upon the frame, a brush mounted to rotate between the runs of the carrier and having a mounting adjustable toward the upper run, a grid adjustably mounted above the carrier, and a brush rotatable above and transversely of the grid, and swingingly mounted for adjustment toward the carrier.

14. A device of the class described comprising a base frame, an endless carrier having spaced transverse bars, a grid spaced above the carrier and brushes arranged respectively between the runs of the carrier, and above the grid, each having bristles extending into the space between the grid and the upper run of the belt.

15. A frame, an endless carrier thereon, elements vertically adjustable at opposite sides of the frame, a brush arranged between the belt runs, and journaled upon the elements, arms movable with the adjustable elements, and swingable about the axis of rotation of the lower brush and extending above the frame, and a brush journaled upon the arms above the upper run of the belt and driving means connecting upper and lower brushes.

16. A frame, an endless carrier thereon, elements vertically adjustable at opposite sides of the frame, a brush arranged between the belt runs, stub shafts carried by respective adjustable elements and detachably engaged with the brush to support it, one of the shafts having a driving connection with the brush, and both shafts being arranged to permit release of the brush by movement in an axial direction.

17. A frame, an endless carrier thereon, elements vertically adjustable at opposite sides of the frame, a brush arranged between the belt runs, stub shafts carried by respective adjustable elements and detachably engaged with the brush to support it, one of the shafts having a driving connection with the brush, and both shafts being arranged to permit release of the brush by movement in an axial direction, the non-driving shaft having means to releasably secure it in brush-supporting position, and to allow it to be withdrawn in an axial direction to release the brush, arms rotatable about the shafts and extending above the frame, a brush including a shaft detachably journaled upon the arms above the upper run of the belt, driving means connecting the upper shaft and the driving shaft of the lower brush, and arranged at one side of the corresponding arm, and driving means on the opposite side of the arm keyed to drive the shaft.

18. An endless conveyor composed of spaced, transverse grid bars, a brush between the runs of the conveyor having bristles extending through the bars of the upper run, a grid spaced above the upper run and composed of bars extending in direction of travel of the carrier, and a brush arranged above the grid and having bristles extending downwardly therethrough.

19. An endless conveyor composed of spaced, transverse grid bars, a brush between the runs of the conveyor having bristles extending through the bars of the upper run, a grid spaced above the upper run and composed of spaced bars, and yieldably connected to permit its rise and fall, and a brush arranged above the grid and having bristles extending downwardly therethrough.

20. An endless conveyor mounted on the frame and composed of spaced transverse grid bars, a brush between the runs of the conveyor having bristles extending through the bars of the upper run, a grid spaced above the upper run and composed of bars extending in direction of travel of the carrier, and yieldably connected at its forward end to permit its rise and fall, and pivotally mounted at its opposite end, and a brush arranged above the grid and having bristles extending downwardly therethrough.

21. An endless conveyor mounted on the frame and composed of spaced transverse grid bars, a brush between the runs of the conveyor having bristles extending through the bars of the upper run, a grid spaced above the upper run and composed of bars extending in direction of travel of the carrier, and yieldably connected at its forward end to permit its rise and fall, and pivotally mounted at its opposite end, and a brush arranged above the grid and having bristles extending downwardly therethrough, the pivotal mounting of the grid being adjustable toward and away from the conveyor.

In witness whereof, I have hereunto set my hand this 13th day of October 1926.

GEORGE A. HORMEL.